(12) United States Patent
Wiggs

(10) Patent No.: US 7,841,200 B1
(45) Date of Patent: Nov. 30, 2010

(54) SUB-SURFACE TUBING SPACER MEANS FOR DIRECT EXPANSION HEATING/COOLING SYSTEMS

(75) Inventor: B. Ryland Wiggs, Brentwood, TN (US)

(73) Assignee: Earth to Air Systems, LLC, Franklin, TN (US)

( * ) Notice: Subject to any disclaimer, the term of this patent is extended or adjusted under 35 U.S.C. 154(b) by 897 days.

(21) Appl. No.: 10/849,316

(22) Filed: May 19, 2004

Related U.S. Application Data

(60) Provisional application No. 60/471,585, filed on May 19, 2003.

(51) Int. Cl.
*F25D 23/12* (2006.01)
*F24J 3/08* (2006.01)

(52) U.S. Cl. .......................... 62/260; 165/45
(58) Field of Classification Search .................. 62/260; 165/45, 142
See application file for complete search history.

(56) References Cited

U.S. PATENT DOCUMENTS

| | | | | |
|---|---|---|---|---|
| 4,224,805 A | 9/1980 | Rothwell | ...................... | 62/260 |
| 4,257,239 A | 3/1981 | Partin et al. | ................. | 62/238.7 |
| 4,378,787 A | 4/1983 | Fleischmann | ............... | 126/430 |
| 4,544,021 A | 10/1985 | Barrett | .......................... | 165/45 |
| 4,741,388 A | 5/1988 | Kuroiwa | ...................... | 165/45 |
| 5,025,634 A | 6/1991 | Dressler | ......................... | 62/79 |
| 5,038,580 A | 8/1991 | Hart | ........................... | 62/324.6 |
| 5,313,804 A | 5/1994 | Kaye | ........................... | 62/160 |
| 5,339,890 A * | 8/1994 | Rawlings | ..................... | 165/45 |
| 5,461,876 A | 10/1995 | Dressler | ...................... | 62/160 |
| 5,477,914 A | 12/1995 | Rawlings | ..................... | 165/45 |
| 5,533,355 A | 7/1996 | Rawlings | ..................... | 62/260 |
| 5,560,220 A | 10/1996 | Cochran | ...................... | 62/260 |
| 5,561,985 A | 10/1996 | Cochran | ...................... | 62/260 |
| 5,564,282 A | 10/1996 | Kaye | ........................... | 62/160 |
| 5,623,986 A | 4/1997 | Wiggs | ......................... | 165/45 |
| 5,671,608 A | 9/1997 | Wiggs et al. | .................. | 62/260 |
| 5,706,888 A | 1/1998 | Ambs et al. | ................. | 165/155 |
| 5,738,164 A | 4/1998 | Hildebrand | .................. | 165/45 |
| 5,758,514 A | 6/1998 | Genung | ......................... | 62/471 |
| 5,771,700 A | 6/1998 | Cochran | ......................... | 62/117 |
| 5,816,314 A | 10/1998 | Wiggs et al. | .................. | 165/45 |
| 5,875,644 A | 3/1999 | Ambs et al. | ................. | 62/324.6 |
| 5,937,665 A | 8/1999 | Kiessel et al. | ................. | 62/260 |
| 5,937,934 A | 8/1999 | Hildebrand | .................. | 165/45 |
| 5,941,238 A | 8/1999 | Tracy | .......................... | 126/641 |
| 5,946,928 A | 9/1999 | Wiggs | ......................... | 62/260 |
| 6,138,744 A | 10/2000 | Coffee | .......................... | 165/45 |
| 6,212,896 B1 | 4/2001 | Genung | ......................... | 62/260 |
| 6,251,179 B1 * | 6/2001 | Allan | .......................... | 106/719 |
| 6,276,438 B1 | 8/2001 | Amerman et al. | ............. | 165/45 |
| 6,450,247 B1 | 9/2002 | Raff | ............................ | 165/45 |
| 6,615,601 B1 | 9/2003 | Wiggs | ........................ | 62/235.1 |
| 6,751,974 B1 | 6/2004 | Wiggs | ......................... | 62/260 |
| 2004/0129408 A1 | 7/2004 | Wiggs | | |

* cited by examiner

*Primary Examiner*—Chen-Wen Jiang
(74) *Attorney, Agent, or Firm*—Miller, Matthias & Hull LLP

(57) ABSTRACT

A direct expansion geothermal heat exchange system with spacer fins attached to at least one of a sub-surface refrigerant transport tubing containment pipe and to sub-surface refrigerant transport tubing, so as to ensure the sub-surface pipe/tubing does not come into direct contact with the ground and is surrounded/encased by a thermally conductive grout that is resistant to corrosive sub-surface elements.

11 Claims, 1 Drawing Sheet

SUB-SURFACE TUBING SPACER MEANS FOR DIRECT EXPANSION HEATING/COOLING SYSTEMS

CROSS-REFERENCES TO RELATED APPLICATIONS

This application is a Non-Provisional Utility application which claims benefit of co-pending U.S. Provisional Patent Application Ser. No. 60/471,585 filed May 19, 2003, entitled "Deep Well-Long Trench Direct Expansion Heating/Cooling System and Retrofit Design" which is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an improved means, in a direct exchange heating/cooling system, of protecting at least one of sub-surface refrigerant transport tubing containment pipes and sub-surface refrigerant transport tubing from corrosive sub-surface elements by means of providing spacer devices, such as spacer fins or the like, so as to keep the pipes/tubing away from direct contact with the ground as the space between the pipes/tubing is filled with a corrosive resistant and heat conductive grout.

Ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, water, or water with antifreeze, in plastic underground geothermal tubing so as to transfer heat to or from the ground, with a second heat exchange step utilizing a refrigerant to transfer heat to or from the water, and with a third heat exchange step utilizing an air handler, which is typically comprised of finned copper tubing and an electric fan, to transfer heat to or from the refrigerant to heat or cool interior air space.

Direct exchange ("DX") heating/cooling systems (also commonly referred to as "direct expansion" ground source/geothermal heating/cooling systems) where the refrigerant transport lines are placed directly in the sub-surface ground and/or water, typically circulate a refrigerant fluid, such as R-22, in sub-surface refrigerant lines, typically comprised of copper tubing, to transfer heat to or from the ground, and only require a second heat exchange step to transfer heat to or from the interior air space by means of an air handler. Consequently, DX systems are generally more efficient than water-source systems because of less heat exchange steps and because no water pump energy expenditure is required. Further, since copper is a better heat conductor than most plastics, and since the refrigerant fluid circulating within the copper tubing of a DX system generally has a greater temperature differential with the surrounding ground than the water circulating within the plastic tubing of a water-source system, generally, less excavation and/or drilling is required, and installation costs are lower, with a DX system than with a water-source system.

While most in-ground/in-water heat exchange designs are feasible, various improvements have been developed intended to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

Typically, in DX system applications, the sub-surface refrigerant transport tubing is one of backfilled with natural earth and backfilled with a heat conductive grout material. Generally, the quickest and/or the best geothermal heat transfer results from backfilling the tubing with a heat conductive grout.

A DX system's sub-surface refrigerant transport tubing, which generally always is comprised of copper tubing/lines, is generally impervious to most soils and has an extremely long life expectancy due to the natural properties of copper and the green colored cuprous oxide film that forms on the tubing's surface. However, when copper is installed in sub-surface conditions with a ph below 5.5 or above 11, or in sub-surface conditions that may otherwise be corrosive to copper (such as in sulfur water or near a septic system or the like), a means to protect the copper lines from deterioration is desirable.

Historically, the sub-surface lines of a DX system have been protected via cathodic protection (which is well understood by those skilled in the art), or have simply not been installed in close proximity to corrosive elements. While cathodic protection works well for near surface applications, it is more difficult and expensive to utilize in vertically oriented deep well/borehole tubing applications (a deep well/borehole application is herein defined as being in excess of 100 feet deep).

Further, the simple avoidance of tubing installations in areas of corrosive soils restricts the ability to install DX systems in various applications due to unavailability of sufficient non-corrosive land area for geothermal heat transfer.

While many water-source heat pump system applications utilize tubing spacer devices, such spacer devices are designed to keep the supply and return water transport tubing apart from one another, and are further generally intended to push each respective tube against the natural wall of the well/borehole, as is well understood by those skilled in the art. Since the plastic polyethylene tubing typically utilized in water-source system applications is corrosive resistant, the spacer devices are intended to push the tubes as close as possible to the natural, unexcavated, earth so as to theoretically improve natural heat conductivity, all while keeping the two respective lines as far apart as possible so as to avoid as much as possible of the heat gain/loss "short circuiting" effect inherent in all water-source systems. The "short circuiting" effect is caused by the heat transfer fluid (the entering fluid being cool in the heating mode and warm in the cooling mode) entering the sub-surface heat exchange area through one pipe and exiting the heat exchange area (after the fluid has gained heat in the heating mode and rejected heat in the cooling mode) through an operatively coupled second pipe, which second pipe is typically in close proximity to the first entering pipe of a differing temperature extreme. However, in DX system designs as taught by Wiggs, where the liquid refrigerant transport line is all or mostly insulated and where only the vapor refrigerant transport line is fully exposed, the heat gain/loss "short circuiting" effect is eliminated or minimized, thus there is no need to push the two lines as far apart as possible. Further, since some sub-surface environments can be corrosive to copper, in such instances it is not desirable to push the exposed copper line against the native earth.

Thus, a means to protect the copper refrigerant transport tubing, or other metal refrigerant transport tubing, in a DX system, from corrosive sub-surface environments, absent the necessity of installing an expensive and time-consuming separate cathodic protection system, would be preferred and would extend the application of DX system installations to areas that would otherwise simply be avoided.

BRIEF SUMMARY OF THE INVENTION

It is an object of the present invention to further enhance and improve predecessor DX system sub-surface tubing installation means by the utilization of spacing devices, such as spacer fins or the like, to ensure all sub-surface tubing is surrounded by a protective heat-conductive grout in a manner so as to avoid direct tubing contact with potentially/actually corrosive surrounding sub-surface element conditions. The subject invention may be utilized to protect larger diameter sub-surface metal tubing used to contain smaller diameter refrigerant transport tubing/lines. Alternatively, the subject invention may be utilized to protect both the subsurface liquid refrigerant transport lines, whether insulated and/or un-insulated, and the un-insulated subsurface vapor refrigerant transport lines when such refrigerant transport lines are directly installed into the ground absent a containment pipe.

The utilization of spacer fins, for example, which fins would extend from one of the sub-surface containment pipe and the sub-surface refrigerant transport tubing, including extending from any insulated sub-surface refrigerant transport tubing, would help to ensure the one of pipe and tubing is fully surrounded by a protective grout encasement. Such fins would preferably be vertically angled/oriented in a vertically angled well/borehole system application. The fins would be spaced apart and designed to maintain at least a minimum spacing (such as at least one-half inch) between the one of pipe and tubing and the surrounding ground.

The vertically oriented fins would be attached to the outside perimeter of the pipe/tube. In a vertical well/borehole system application, such as a deep well/borehole application for example, the fins would be placed around the outside perimeter of a refrigerant transport tubing containment pipe. In the alternative, the fins would be placed around each of the liquid refrigerant transport line, whether insulated or un-insulated, and the thermally exposed (un-insulated) vapor refrigerant transport line. In another alternative, the liquid refrigerant transport line, whether insulated or un-insulated, and the vapor refrigerant transport line would be periodically tied together (with wire ties or the like) so as to form a combined line set, and the fins would be placed around the combined line set, so as to permit the grout to fully surround both the liquid line, whether insulated or un-insulated, and the thermally exposed vapor line.

Generally, multiple spacing devices (a spacing device set), such as fins (a fin set) or the like, would be comprised of at least three spacing devices/fins that would surround one of each pipe/line/tube and the line/tube set at least once every twenty feet of line/line set (also referred to as tubing/tubing set) length in a vertically oriented DX system installation, with the fins in each fin set being equally spaced/placed apart around the pipe/line/line set at each respective twenty foot minimum length segment. Preferably, for rigidity purposes, such vertically oriented spacer fins would each respectively be at least ⅛ inch thick, would be at least 2 inches long, and would be at least ½ inch high (so as to ensure at least a ½ inch grout separation between the containment pipe and/or the refrigerant transport tubing and the surrounding earth). Preferably, each such spacer fin would have at least two holes drilled near the base of each respective end for insertion of a wire-tie, or the like, to secure the spacer fin in place around the sub-surface containment pipe and/or the sub-surface refrigerant transport tubing/tubing set. While spiraled or other forms of spacer fins may be utilized, the utilization of vertically oriented spacer fins would typically be preferred in a vertically oriented system because they would facilitate the introduction and withdrawal of a grout line (also commonly called a trimme tube) within the confined area of a well/borehole.

In a horizontal system installation, one of the containment pipe and the copper refrigerant transport lines/tubes would typically be laid into pre-poured grout, with optional vertically or horizontally oriented spacer devices/fins designed to maintain at least a minimum spacing (such as at least one-half inch) between the pipe/tubing and the surrounding ground. In a horizontally oriented DX system application, the spacing devices/spacer fins may need to be placed at least once every five feet of horizontal line/tube distance so as to negate otherwise potentially sagging pipes/lines from becoming to close to the ground via gravitational effects.

In addition to providing a protective shield/barrier against corrosive elements, such a protective grout encasement, ensured by means of spacer devices such as spacer fins or the like, would provide some initial heat dissipation buffer area between the copper heat transfer tubing itself and the surrounding soil. Such a heat dissipation buffer area is particularly advantageous in clay geothermal surroundings where the heat generated and transferred through the sub-surface copper heat exchange tubing in a cooling mode operation would otherwise tend to cause the clay to dry and pull away from the heat transfer tubing itself, leaving sir gaps and thereby materially reducing system operational efficiencies.

For protection against corrosive soils and/or water, as well as for heat dissipation buffer purposes in clay soils, the heat conductive fill material should consist of a thermally conductive grout which inhibits water infiltration, such as a cementitious grout. For example, a good type grout to utilize is a grout such as cementitious grout 111, which cures into a solid and inhibits infiltration of corrosive elements. Grout 111 is principally comprised of 66% silica sand, 30% portland cement, water and plasticized additives, which can have an excellent heat transfer rate of 1.5 BTUs/Ft·Hr. degrees F. Such a thermally conductive grout's ability to inhibit water transfer both protects metal containment pipes and copper refrigerant transport tubing from corrosive elements and prevents the exposed pipe and/or the vapor refrigerant transport line from driving moisture away from, and from shrinking, its respective directly adjacent geothermal encasement.

There are shown in the drawings embodiments of the invention as presently preferred. It should be understood, however, that since any number, shape, and/or size of spacing devices could be utilized and respectively operatively connected, in a variety of arrangements, such as spiraled, or the like, to any number of containment pipes and/or refrigerant transport lines, so as to effect the maintenance of at least one of a grout barrier and a thermal buffer between the copper refrigerant transport lines (in at least one of a vertically oriented and a horizontally oriented inclination) and the sub-surface elements, the invention is not limited to the simple exemplary arrangements and instrumentalities shown in the drawings. The drawings generally demonstrate a side view and a top view of one refrigerant transport line (which could alternatively be a containment pipe) surrounded by a set of three spacer fins, and a top view of one refrigerant transport line set (comprised of an insulated liquid line wire-tied to an exposed vapor line) surrounded by a set of three spacer fins, wherein:

BRIEF DESCRIPTION OF THE SEVERAL VIEWS OF THE DRAWINGS

There are shown in the drawings embodiments of the invention as presently preferred. It should be understood, however, that the invention is not limited to the precise arrangements and instrumentalities shown.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
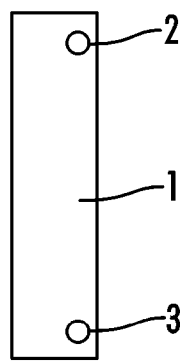
FIG. 1 shows a side view of a spacing device comprised of a spacer fin, with an upper hole and a lower hole respectively drilled or punched through the spacer fin.

Referring now to the drawings in detail, where like numerals refer to like parts or elements, there is shown in FIG. 1 a side view of a spacing device comprised of a spacer fin 1, with an upper hole 2 and a lower hole 3 respectively drilled or punched through the spacer fin 1 for purposes of securing the spacer fin 1 in place.

Figure 2:
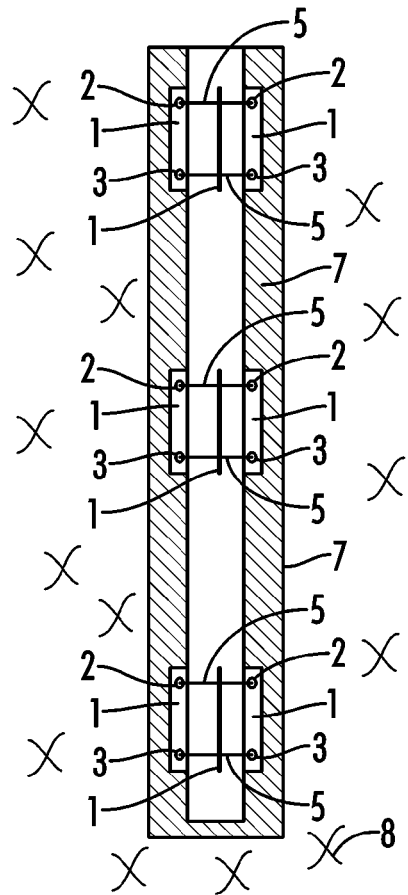
FIG. 2 shows a side view of a series of three, vertically oriented, respective spacing devices, comprised of spacer fins, secured around a refrigerant transport tube/line (which could alternatively be a protective watertight containment pipe) by wire ties, so as to keep the tube/line far enough away from the interior wall of the deep well/borehole to allow the tube/line to be completely surrounded by a protective thermal grout.

FIG. 2 shows a side view of a series of three, vertically oriented, respective spacer devices comprised of spacer fins 1 secured around a refrigerant transport tube 4 (which could alternatively be a refrigerant transport tubing containment pipe) by wire ties 5. While the wire ties 5 are shown herein because they are simple and inexpensive means of securing the spacer fins 1, a pre-built plastic clip (not shown herein), or the like, containing multiple spacer fins could also be utilized, as would be obvious. The wire ties 5 go, respectively, through the upper holes 2 in the spacer fins 1, around the refrigerant transport tube 4, through the lower holes 3 in the spacer fins 1 and around the refrigerant transport tube 4 in a secured manner. The vertically oriented spacer fins 1 serve to keep the refrigerant transport tube 4 away from the interior wall of the well/borehole 6 as the refrigerant transport tube 4 is lowered into, and situated within, the well/borehole 6, so as to ensure that a protective thermally conductive grout 7, such as a cementitious grout 111, or the like, will completely envelop and surround/encase the refrigerant transport tube 4, protecting the refrigerant transport tube 4 from potential corrosive elements in the surrounding earth 8.

Figure 3:
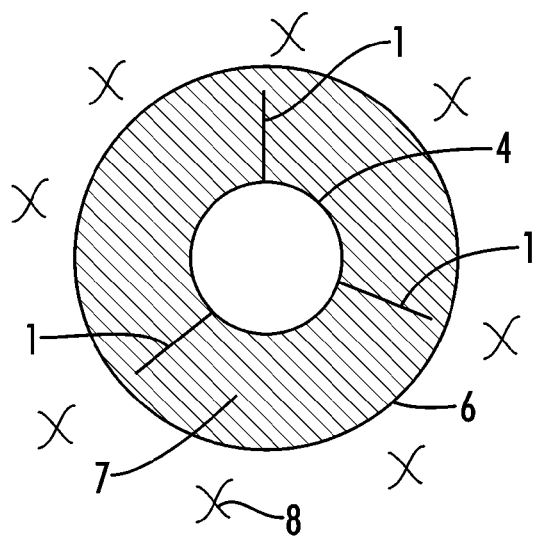
FIG. 3 shows a top view of three, vertically oriented, spacer devices, comprised of spacer fins, approximately equally spaced around a refrigerant transport tube/line (which could alternatively be a protective watertight containment pipe), secured by wire ties, within a well/borehole filled with grout.

FIG. 3 shows a top view of three spacing devices comprised of spacer fins 1 approximately equally spaced around a protective refrigerant transport tube 4 (which could alternatively be a refrigerant transport tubing containment pipe) within a well/borehole 6. So long as at least three spacer fins 1 are secured in a vertically oriented fashion around the refrigerant transport tube 4 about every 20 feet in length/depth, the refrigerant transport tube 4 will be spaced far enough away from the interior wall of the deep well/borehole 6 to permit the introduction of a protective surrounding thermal grout 7, such as a cementitious grout or the like. Such a thermal grout 7 will keep potential or actual naturally occurring sub-surface corrosive elements (not shown herein) away from the refrigerant transport tube 4, and will additionally provide a thermal buffer between the refrigerant transport tube 4 and the surrounding earth 8.

Figure 4:
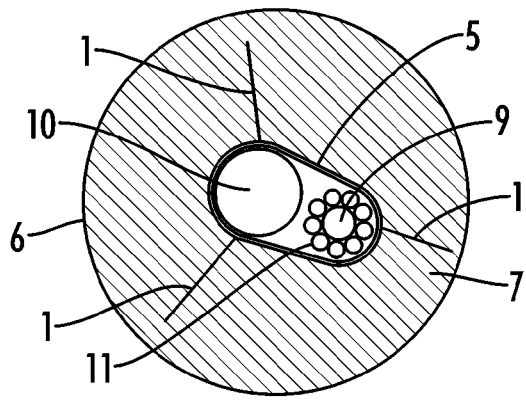
FIG. 4 shows a top view of one refrigerant transport line set, comprised of an insulated liquid line wire-tied to an exposed vapor line, with a set of three spacer devices, comprised of spacer fins within a well/borehole filled with grout.

FIG. 4 shows a top view of one refrigerant transport line set comprised of an insulated 11 liquid refrigerant transport line/tube 9 wire-tied 5 to an exposed and un-insulated vapor refrigerant transport line/tube 10, with a set of three spacer devices comprised of spacer fins1 to keep the line/tubes, 9 and 10, away from the interior wall of a well/borehole 6 as the space between the line/tubes, 9 and 10, the spacer fins 1, and the interior wall of the well/borehole 6 is filled with a thermally conductive grout 7. The grout 7 preferably cures into a solid that inhibits water migration and does not shrink or crack, such as a grout type 111 mixture or the like.

It is an object of the present invention to further enhance and improve predecessor DX system sub-surface tubing installation means by the utilization of spacing devices, such as spacer fins or the like, to ensure all sub-surface tubing is surrounded by a protective heat-conductive grout in a manner so as to avoid direct tubing contact with potentially/actually corrosive surrounding sub-surface element conditions. The subject invention may be utilized to protect larger diameter sub-surface metal tubing used to contain smaller diameter refrigerant transport tubing/lines. Alternatively, the subject invention may be utilized to protect both the subsurface liquid refrigerant transport lines, whether insulated and/or un-insulated, and the un-insulated subsurface vapor refrigerant transport lines when such refrigerant transport lines are directly installed into the ground absent a containment pipe.

The utilization of spacer fins, for example, which fins would extend from one of the sub-surface containment pipe and the sub-surface refrigerant transport tubing, including extending from any insulated sub-surface refrigerant transport tubing, would help to ensure the one of pipe and tubing is fully surrounded by a protective grout encasement. Such fins would preferably be vertically angled/oriented in a vertically angled well/borehole system application. The fins would be spaced apart and designed to maintain at least a minimum spacing (such as at least one-half inch) between the one of pipe and tubing and the surrounding ground.

The vertically oriented fins would be attached to the outside perimeter of the pipe/tube. In a vertical well/borehole system application, such as a deep well/borehole application for example, the fins would be placed around the outside perimeter of a refrigerant transport tubing containment pipe. In the alternative, the fins would be placed around each of the liquid refrigerant transport line, whether insulated or un-insulated, and the thermally exposed (un-insulated) vapor refrigerant transport line. In another alternative, the liquid refrigerant transport line, whether insulated or un-insulated, and the vapor refrigerant transport line would be periodically tied together (with wire ties or the like) so as to form a combined line set, and the fins would be placed around the combined line set, so as to permit the grout to fully surround both the liquid line, whether insulated or un-insulated, and the thermally exposed vapor line.

Generally, multiple spacing devices (a spacing device set), such as fins (a fin set) or the like, would be comprised of at least three spacing devices/fins that would surround one of each pipe/line/tube and the line/tube set at least once every twenty feet of line/line set (also referred to as tubing/tubing set) length in a vertically oriented DX system installation, with the fins in each fin set being equally spaced/placed apart around the pipe/line/line set at each respective twenty foot minimum length segment. Preferably, for rigidity purposes, such vertically oriented spacer fins would each respectively be at least ⅛ inch thick, would be at least 2 inches long, and would be at least ½ inch high (so as to ensure at least a ½ inch grout separation between the containment pipe and/or the refrigerant transport tubing and the surrounding earth). Preferably, each such spacer fin would have at least two holes drilled near the base of each respective end for insertion of a wire-tie, or the like, to secure the spacer fin in place around the sub-surface containment pipe and/or the sub-surface refrigerant transport tubing/tubing set. While spiraled or other forms of spacer fins may be utilized, the utilization of vertically oriented spacer fins would typically be preferred in a vertically oriented system because they would facilitate the introduction and withdrawal of a grout line (also commonly called a trimme tube) within the confined area of a well/borehole.

In a horizontal system installation, one of the containment pipe and the copper refrigerant transport lines/tubes would typically be laid into pre-poured grout, with optional vertically or horizontally oriented spacer devices/fins designed to maintain at least a minimum spacing (such as at least one-half inch) between the pipe/tubing and the surrounding ground. In a horizontally oriented DX system application, the spacing devices/spacer fins may need to be placed at least once every five feet of horizontal line/tube distance so as to negate otherwise potentially sagging pipes/lines from becoming to close to the ground via gravitational effects.

In addition to providing a protective shield/barrier against corrosive elements, such a protective grout encasement, ensured by means of spacer devices such as spacer fins or the like, would provide some initial heat dissipation buffer area between the copper heat transfer tubing itself and the surrounding soil. Such a heat dissipation buffer area is particularly advantageous in clay geothermal surroundings where the heat generated and transferred through the sub-surface copper heat exchange tubing in a cooling mode operation would otherwise tend to cause the clay to dry and pull away from the heat transfer tubing itself, leaving sir gaps and thereby materially reducing system operational efficiencies.

For protection against corrosive soils and/or water, as well as for heat dissipation buffer purposes in clay soils, the heat conductive fill material should consist of a thermally conductive grout which inhibits water infiltration, such as a cementitious grout. For example, a good type grout to utilize is a grout such as cementitious grout 111, which cures into a solid and inhibits infiltration of corrosive elements. Grout 111 is principally comprised of 66% silica sand, 30% portland cement, water and plasticized additives, which can have an excellent heat transfer rate of 1.5 BTUs/Ft·Hr. degrees F. Such a thermally conductive grout's ability to inhibit water transfer both protects metal containment pipes and copper refrigerant transport tubing from corrosive elements and prevents the exposed pipe and/or the vapor refrigerant transport line from driving moisture away from, and from shrinking, its respective directly adjacent geothermal encasement.

There are shown in the drawings embodiments of the invention as presently preferred. It should be understood, however, that since any number, shape, and/or size of spacing devices could be utilized and respectively operatively connected, in a variety of arrangements, such as spiraled, or the like, to any number of containment pipes and/or refrigerant transport lines, so as to effect the maintenance of at least one of a grout barrier and a thermal buffer between the copper refrigerant transport lines (in at least one of a vertically oriented and a horizontally oriented inclination) and the sub-surface elements, the invention is not limited to the simple exemplary arrangements and instrumentalities shown in the drawings. The drawings generally demonstrate a side view and a top view of one refrigerant transport line (which could alternatively be a containment pipe) surrounded by a set of three spacer fins, and a top view of one refrigerant transport line set (comprised of an insulated liquid line wire-tied to an exposed vapor line) surrounded by a set of three spacer fins, wherein:

What is claimed is:

1. At least one of a direct expansion heat pump system sub-surface refrigerant transport tubing containment pipe arrangement and a direct expansion heat pump system sub-surface refrigerant transport tubing arrangement positioned inside a well/borehole having an interior wall defined by naturally occurring sub-surface elements, the well/borehole extending along well/borehole axis, the arrangement comprising:

at least one spacer device positioned between at least one of the sub-surface containment pipe and the sub-surface refrigerant transport tubing and the naturally occurring sub-surface elements, the spacer device being functional to space the at least one of the sub-surface containment pipe and the sub-surface refrigerant transport tubing away from the interior wall of the well/borehole, the spacer device being oriented substantially parallel to the well/borehole axis and extending only partially along the length of the at least one of the sub-surface containment pipe and the sub-surface refrigerant transport tubing; and a heat conductive grout fill material disposed between the at least one of the sub-surface refrigerant transport tubing containment pipe and the sub-surface refrigerant transport tubing, the at least one spacer device, and the naturally occurring sub-surface elements.

2. The arrangement of claim 1, wherein at least one spacer device is placed at least once every twenty feet of containment pipe/refrigerant transport tubing length segment in a system with vertically oriented sub-surface refrigerant transport tubing.

3. The arrangement of claim 1, wherein at least one spacer device is placed at least once every five feet of containment pipe/refrigerant transport tubing length segment in a system with horizontally oriented sub-surface refrigerant transport tubing.

4. The arrangement of claim 1, wherein the at least once spacer device is comprised of at least one spacer fin.

5. The arrangement of claim 4, wherein the at least one spacer fin is at least ⅛ inch thick, is at least 2 inches long, and is at least ½ inch high.

6. The arrangement of claim 1, wherein multiple spacer devices comprise a spacer device set, and wherein multiple spacer device sets are discretely spaced along the containment pipe or refrigerant transport tubing.

7. The arrangement of claim 6, wherein the multiple spacer devices in each spacer device set are equally spaced around a circumference of at least one of the containment pipe and the refrigerant transport tubing.

8. At least one of a direct expansion heat pump system sub-surface refrigerant transport tubing containment pipe arrangement and a direct expansion heat pump system sub-surface refrigerant transport tubing arrangement positioned inside a well/borehole having an interior wall defined by naturally occurring sub-surface elements, the arrangement comprising:

at least one spacer device positioned between at least one of the sub-surface containment pipe and the sub-surface refrigerant transport tubing and the naturally occurring sub-surface elements, the spacer device being functional to space the at least one of the sub-surface containment pipe and the sub-surface refrigerant transport tubing away from the interior wall of the well/borehole; and a heat conductive grout fill material disposed between the at least one of the sub-surface refrigerant transport tubing containment pipe and the sub-surface refrigerant transport tubing, the at least one spacer device, and the naturally occurring sub-surface elements;

wherein multiple spacer devices comprise a spacer device set, and wherein multiple spacer device sets are discretely spaced along the containment pipe or refrigerant transport tubing by a minimum length segment of at least approximately twenty feet in a system with vertically oriented sub-surface refrigerant transport tubing.

9. The arrangement of claim 8, wherein the multiple spacer devices in each spacer device set are equally spaced around a circumference of at least one of the containment pipe and the refrigerant transport tubing.

10. The arrangement of claim 8, wherein the respective multiple spacer devices comprise spacer fins.

11. The arrangement of claim 10, wherein the spacer fins are each respectively at least ⅛ inch thick, are each at least 2 inches long, and are each at least ½ inch high.

* * * * *